(12) United States Patent
Chandrasekaran et al.

(10) Patent No.: US 10,728,701 B1
(45) Date of Patent: Jul. 28, 2020

(54) PROXIMITY FRIENDING

(71) Applicant: Roblox Corporation, San Mateo, CA (US)

(72) Inventors: Deepak Murali Chandrasekaran, Belmont, CA (US); Jessica Kung, Redwood City, CA (US)

(73) Assignee: Roblox Corporation, San Mateo, CA (US)

( * ) Notice: Subject to any disclaimer, the term of this patent is extended or adjusted under 35 U.S.C. 154(b) by 129 days.

(21) Appl. No.: 15/628,319

(22) Filed: Jun. 20, 2017

(51) Int. Cl.
| | |
|---|---|
| *H04W 4/02* | (2018.01) |
| *G07F 17/32* | (2006.01) |
| *A63F 13/32* | (2014.01) |
| *A63F 13/00* | (2014.01) |
| *H04L 12/58* | (2006.01) |
| *G06Q 50/00* | (2012.01) |

(52) U.S. Cl.
CPC .............. *H04W 4/023* (2013.01); *A63F 13/00* (2013.01); *A63F 13/32* (2014.09); *G06Q 50/01* (2013.01); *G07F 17/3237* (2013.01); *H04L 51/20* (2013.01); *H04L 51/24* (2013.01)

(58) Field of Classification Search
CPC ..... G06Q 50/01; G07F 17/3241; A63F 13/12; A63F 13/30; A63F 13/31; A63F 13/32; A63F 13/327; A63F 13/335; A63F 2300/407
USPC ......................................................... 705/319
See application file for complete search history.

(56) References Cited

U.S. PATENT DOCUMENTS

| | | | | |
|---|---|---|---|---|
| 7,634,569 | B2 * | 12/2009 | VanAntwerp | A63F 13/12 709/227 |
| 9,033,803 | B1 * | 5/2015 | Etter | H04L 67/38 463/42 |
| 9,289,686 | B2 * | 3/2016 | Hall | A63F 13/00 |
| 9,451,397 | B1 * | 9/2016 | Lee | H04W 4/02 |
| 9,832,625 | B2 * | 11/2017 | Nebel | H04W 4/21 |
| 2003/0093669 | A1 * | 5/2003 | Morais | A63F 13/12 713/163 |
| 2007/0218997 | A1 * | 9/2007 | Cho | A63F 13/12 463/42 |

(Continued)

OTHER PUBLICATIONS cellphonetrackers.org. Track down a cell phone location using WiFi hotspots. Apr. 3, 2015. [Retrieved on: Dec. 19, 2018]. Retrieved from internet: <URL:https://web.archive.org/web/20150403050653/https://cellphonetrackers.org/track-down-cell-phone-wife-hotspots.html>. entire document (Year: 2015).*

*Primary Examiner* — Tamara Griffin
(74) *Attorney, Agent, or Firm* — Lowenstein Sandler LLP

(57) ABSTRACT

A system and method receiving, from a first client device associated with a first user of a collaboration platform, a first request to establish friendship with other users of the collaboration platform that are in physical proximity with the first user. The method includes determining, by a processing device, whether a second user of the collaboration platform is in the physical proximity of the first user by comparing a first indicator of physical proximity associated with the first user with a second indicator of physical proximity associated with the second user. The method also includes responsive to determining the second user of the collaboration platform is in the physical proximity of the first user based on the comparison, sending to the first user an invitation to request a friendship with the second user.

20 Claims, 4 Drawing Sheets

(56) References Cited

U.S. PATENT DOCUMENTS

| | | | | |
|---|---|---|---|---|
| 2008/0056215 | A1* | 3/2008 | Kopikare | H04W 8/005 370/338 |
| 2009/0198666 | A1* | 8/2009 | Winston | G06Q 50/01 |
| 2011/0137813 | A1* | 6/2011 | Stewart | G06Q 50/01 705/319 |
| 2011/0142016 | A1* | 6/2011 | Chatterjee | G06Q 30/02 370/338 |
| 2011/0151892 | A1* | 6/2011 | Vengroff | H04W 4/029 455/456.3 |
| 2011/0179064 | A1* | 7/2011 | Russo | G06Q 10/10 707/769 |
| 2011/0238755 | A1* | 9/2011 | Khan | H04W 4/21 709/204 |
| 2011/0252238 | A1* | 10/2011 | Abuan | H04L 61/2575 713/168 |
| 2012/0329475 | A1* | 12/2012 | Ribaudo | G01S 5/0018 455/456.1 |
| 2013/0254278 | A1* | 9/2013 | Buhr | G06Q 50/01 709/204 |
| 2014/0150068 | A1* | 5/2014 | Janzer | H04L 63/20 726/4 |
| 2014/0187333 | A1* | 7/2014 | Craine | A63F 13/48 463/42 |
| 2015/0304436 | A1* | 10/2015 | Vaccari | G06F 1/3215 709/204 |
| 2015/0356318 | A1* | 12/2015 | Pollari | G06Q 30/02 705/14.64 |
| 2016/0135014 | A1* | 5/2016 | Alharayeri | H04W 4/21 455/456.3 |
| 2017/0034659 | A1* | 2/2017 | Shnitzer | H04W 4/023 |

* cited by examiner

US 10,728,701 B1

PROXIMITY FRIENDING

TECHNICAL FIELD

This disclosure relates to the field of collaboration platforms and, in particular, establishing friendships between users of the collaboration platform that are in physical proximity.

BACKGROUND

Collaboration platforms allow users to connect to and share information with each other via the Internet. Users of a collaboration platform, such as a gaming platform, may participate in multi-user gaming environments, design custom gaming environments, decorate avatars, or exchange virtual items with other users, and so forth.

DESCRIPTION OF DRAWINGS

Various implementations of the present disclosure will be understood more fully from the detailed description given below and from the accompanying drawings of various implementations of the disclosure.

DETAILED DESCRIPTION

Figure 1:
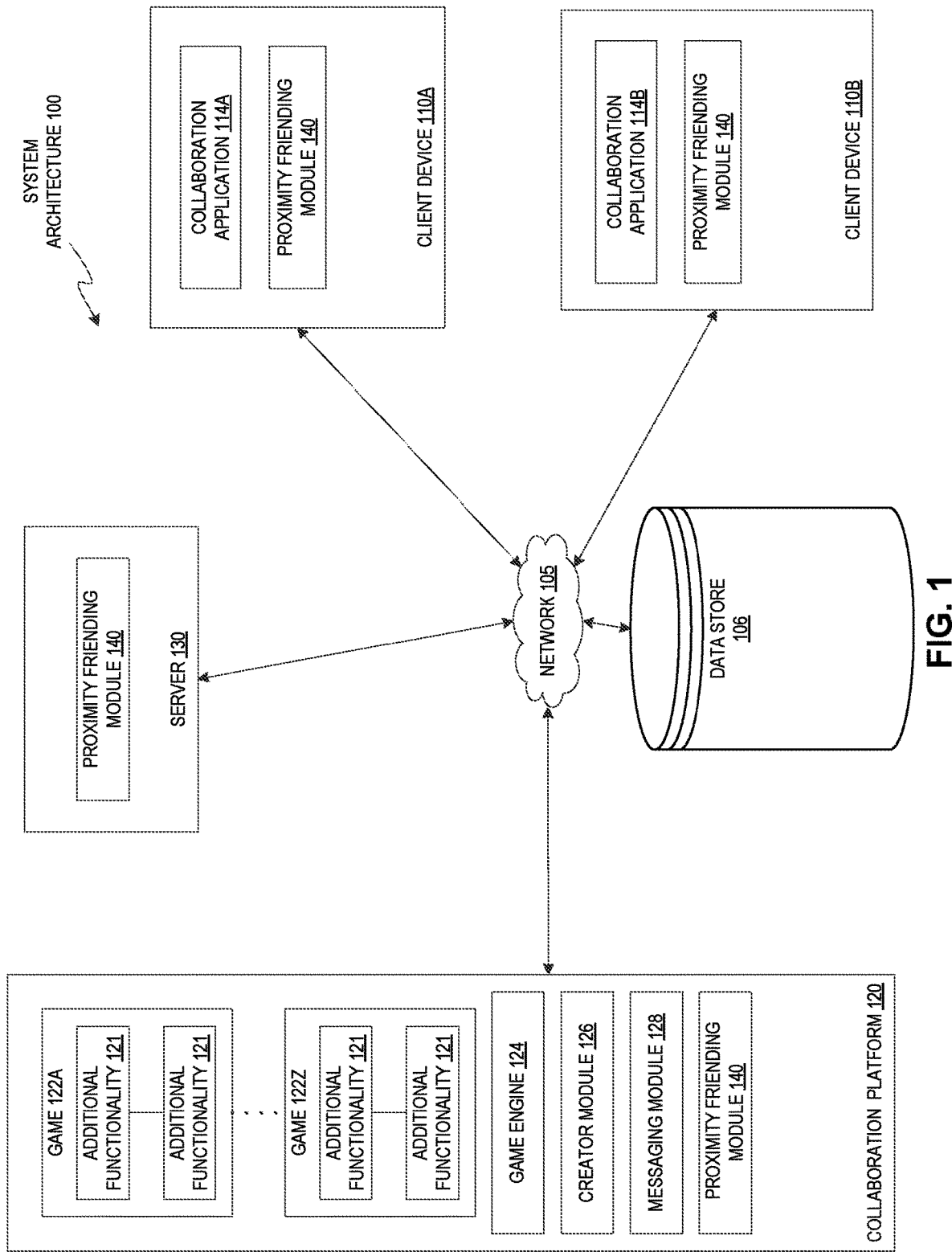
FIG. 1 illustrates an example system architecture, in accordance with implementations of the disclosure.

Collaboration platforms, such as gaming platforms, offer a variety of ways for users to interact with one another. For example, users of a gaming platform may work together towards a common goal, share various gaming items, send electronic messages to one another, and so forth. Users of a collaboration platform may be linked to other users and be recognized by the collaboration platform as "friends." A user and their friends may have special access to one another such as the ability to see information about a friend's user account, send electronic messages to one another, trade items, as well as others. In some systems, establishing friendships may be performed by sending a friend request to another user and having the other user accept the friend request. Determining whether a user sending a friend request can be trusted may present challenges, in particular for minors (e.g., ages under 13 years old) who may be vulnerable to predatory users.

Aspects of the present disclosure address the above-mentioned and other challenges by creating friendships among users that are physically proximate one another. Physical closeness of users may be an indicator or imply that the users are more likely to be trustworthy (e.g., the users are real-life friends). In some implementations, users that establish a trusted friendship using proximity friending may have access to additional functionalities that may not be available to non-trusted friends.

In particular, aspects of the present disclosure receive, from a first client device, a first request to establish friendships with other users of the collaboration platform that are in physical proximity with the first user. The collaboration platform may determine whether a second user is in the physical proximity of the first user by comparing a first indicator of physical proximity associated with the first user with a second indicator of physical proximity associated with the second user. The collaboration platform responsive to determining the second user of the collaboration platform is in the physical proximity of the first user based on the comparison, sends to the first user an invitation to request a friendship with the second user.

By establishing friendships on a collaboration platform with users that are in physical proximity as disclosed herein is advantageous because it provides a safer and more trustworthy way to establish friendships and helps create a safer environment for users (e.g., minors) of the collaboration platform, which improves an overall user experience with the collaboration platform, and increases the content consumed (e.g., time using the collaboration platform) by users of the collaboration platform. In addition, aspects of the present disclosure result in significant reduction of storage resources and significant reduction of computational (processing) resources because initially establishing trustworthy friendships among users that are in physical proximity is more efficient than monitoring for non-trustworthy friendships or performing remedial measures to remedy actions created by users with non-trustworthy friendships, for example.

It may be noted that a collaboration platform described as a gaming platform herein is provided for purposes of illustration, rather than limitation. A collaboration platform may be one or more of numerous platforms, such as a social networking platform, purchasing platform, a messaging platform, creation platform, and so forth.

FIG. 1 illustrates an example system architecture 100, in accordance with one implementation of the disclosure. The system architecture 100 (also referred to as "system" herein) includes client devices 110A and 110B, a network 105, a data store 106, a collaboration platform 120, and a server 130.

In one implementation, network 105 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, and/or a combination thereof.

In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

In implementations, the server 130 may be one or more computing devices (e.g., a rackmount server, a server computer, etc.). In implementations, the server 130 may be included in the collaboration platform 120, be an independent system or be part of another system or platform. The server 130 may include proximity friending module 140.

In some implementations, the collaboration platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to collaboration platform 120. The collaboration platform 120 may also include a website (e.g., a webpage) or application back-end software that may be used to provide a user with access to content provided by collaboration platform 120.

In implementations, collaboration platform 120 may be a type of social network providing connections between users. In implementations of the disclosure, a "user" may be represented as a single individual. However, other implementations of the disclosure encompass a "user" being an entity controlled by a set of users and/or an automated source. For example, a set of individual users federated as a community in a social network may be considered a "user." In another example, an automated consumer may be an automated ingestion pipeline, such as a game 122 or component of a game 122 of the collaboration platform 120.

In one implementation, collaboration platform 120 may be a gaming platform. For example, the gaming platform may provide single-player or multi-player games to a community of users that may access or interact with the games 122A-122Z using client devices 110. In implementations, games 122 (also referred to as "video game," "online game," or "virtual game" herein) may be two-dimensional (2D) games, three-dimensional (3D) games, virtual reality (VR) games, or augmented reality (AR) games, for example. A game 122 can include an electronic file that can be executed or loaded using software, firmware or hardware configured to present the game content (e.g., digital media item) to an entity. In some implementations, collaboration platform 120 hosts games 122 and allows users to interact with the games 122 using collaboration application 114 of client device 110. Users of collaboration platform 120 may play, create, interact with, and build games 122, or create and build contents of games 122. For example, users may create characters, decoration for the characters, one or more virtual environments for an interactive game, or build structures in a game, for example. In implementations, users may buy, sell, or trade game items, such as in-platform currency (e.g., virtual currency), with other users of the collaboration platform 120. In implementations, collaboration platform may transmit game content to collaboration applications 114. Game content (also referred to as "content") may refer to any data or software instructions (e.g., in-game items, user information, video, images, commands, etc.) associated with collaboration platform 120 or collaboration applications 114.

It may be noted that collaboration platform 120 hosting games 122, is provided for purposes of illustration, rather than limitation. In some implementations, collaboration platform 120 may host one or more media items. Media items can include, but are not limited to, digital video, digital movies, digital photos, digital music, audio content, melodies, website content, social media updates, electronic books (ebooks), electronic magazines, digital newspapers, digital audio books, electronic journals, web blogs, real simple syndication (RSS) feeds, electronic comic books, software applications, etc. In implementations, a media item may be an electronic file that can be executed or loaded using software, firmware or hardware configured to present the digital media item to an entity.

In one implementation, collaboration platform 120 may consolidate the game content from the client devices 110 and transmit the consolidated game content (e.g., gaming video, rendering commands, user input, graphics library commands, etc.) to each of the client devices 110 to display interactions of the multiple users in a multi-player gaming environment. In another implementation, collaboration platform 120 may transmit the game content from the one or more client devices 110 to another client device for the other client device to consolidate and display the game content. In another implementation, the collaboration platform 120 may receive the game content (e.g., first user transmitting user input via client device 110A and second user transmitting user input via client device 110B), generate game results (e.g., first user beats second user), and transmit the game results to the client devices 110.

In some implementations, a game 122 may be associated with a particular user or particular group of users (e.g., a private game), or made widely available to users of the collaboration platform 120 (e.g., a public game). In implementations, where collaboration platform 120 associates one or more games 122 with a specific user or group of users, collaboration platform 120 may associated the specific user(s) with a game 122 using user account information (e.g., a user account identifier such as username and password).

In some implementations, collaboration platform 120 may include a game engine 124. In implementations, game engine 124 may be used for the development or execution of games 122. For example, game engine 124 may include a rendering engine ("renderer") for 2D, 3D, VR, or AR graphics, a physics engine or collision detection (and collision response), sound, scripting, animation, artificial intelligence, networking, streaming, memory management, threading, localization support, scene graph, or video support for cinematics.

In implementations, collaboration platform 120 may include a creator module 126. In implementations, creator module 126 may allow users to become creators to design or create environments in an existing game 122 or create new games or create new items within games or environments. In some implementations, a game 122 may have a common set of rules or common goal, and the environments of a game 122 share the common set of rules or common goal. In implementations, different games may have different rules or goals from one another. In some implementations, games may have one or more environments where multiple environments may be linked. For example, a user may build a virtual environment that is linked to another virtual environment created by another user. A character of the virtual game may cross the virtual border to enter the adjacent virtual environment. In implementations, items may refer to objects that are used, created, shared or otherwise depicted in games 122 of the collaboration platform 120. For example, items may include a character, tools, clothing, buildings, vehicles, currency, and so forth.

In implementations, collaboration platform 120 may include proximity friending module 140. As further described herein, proximity friending module 140 may allow a user of collaboration platform 120 to find and establish friends that are in a physical proximity of the user (e.g., proximity friending). In some implementations, friends that are made though proximity friending may be considered "trusted friends" (e.g., forming a trusted relationship) and enjoy more privileges than users that do not have a trusted relationship. For example, users in a trusted relationship may be able to communicate more freely with one another. In implementations, trusted friends may imply safer friendships for younger users (e.g., minors) as trusted friendships are more likely to be with people that know one another in real-life. In some implementations, trusted friendships via proximity friending may be established between users that are already friends in collaboration platform 120. Similarly, a trusted friendship established between users that are already friends via the collaboration platform 120 may allow for additional functionality between the users of the trusted friendship once the trusted friendship is established, as described further below. Proximity friending module 140 will be further described with respect to the subsequent FIGS. 2-4. Server 130 or client devices 110 may also implement proximity friending module 140.

In some implementations, a game 122 may include base functionalities and additional functionalities 121 (also referred to as "privileges" or "additional privileges" herein). In some implementations, users of collaboration platform 120 that are friends may be able to use the base functionalities, but in some instances, may not be able to use the additional functionalities 121 of a game 122 until a trusted friendship is created using proximity friending.

In some implementations, the base functionalities are granted to all (or most) users of collaboration platform 120, and the additional functionalities 121 are granted between users that form a trusted relationship via proximity friending. In some implementations, the additional functionalities 121 may allow for one or more additional privileges or interactions between users (e.g., messaging functionalities, following functionalities, sharing functionalities, purchasing functionalities, inviting functionalities, etc.). In implementations, the one or more additional functionalities 121 may be available between users of a trusted relationship.

In some implementations, users that have not established a trusted relationship with each other may be prevented from using the additional functionalities 121 to interact with each other. In some implementations, users of the collaboration platform 120 that are under a threshold age (e.g., minors that are users under 13 years old) are prevented from using one or more of the additional functionalities 121 to interact with other users with whom a trusted relationship has not been established. In some implementations, users of the collaboration platform 120 that have provided less than a threshold amount of information to the collaboration platform 120 (e.g., guest users, users that have not provided a birth date to the collaboration platform 120, etc.) are prevented from using the additional functionalities 121 to interact with other users with whom a trusted relationship has not been established. In some implementations, users of the collaboration platform 120 that have participated with the collaboration platform 120 for less than a threshold amount of time (e.g., have been registered with the collaboration platform 120 for less than a threshold amount of time (e.g., registered less than one month ago), have logged less than a threshold amount of time of actively participating in the collaboration platform 120 (e.g., less than 50 hours of game time), etc.) are prevented from using the additional functionalities 121 to interact with other users with whom a trusted relationship has not been established.

In some implementations, additional functionality 121 may include messaging functionality that allows user A (e.g., user of client device 110A) and user B (e.g., user of client device 110B) to communicate using a messaging service (e.g., messaging module 128) via the collaboration platform 120 (e.g., posts, chats, personal messages, public messages, messaging in a virtual gaming environment). For example, the messaging functionality may allow users to transmit messages each other. In another example, the messaging functionality allows users to transmit certain types of information (e.g., sensitive information, contact information, name, picture, voice recording, current location, unique identifiers (device ID), etc.) to each other that would otherwise be filtered by messaging module 128. In implementations, messaging module 128 may be used to implement messaging functionality and may further be described below. It may be noted that user A and user B are used for purposes of illustration, rather than limitation. For example, collaboration platform 120 may include one or more users capable of establishing a trusted relationship via proximity friending and that are granted additional functionality 121.

In some implementations, an additional functionality 121 may include a sharing functionality that allows user A and user B to share items with each other via the collaboration platform 120. For example, users of a gaming platform may have a sharing functionality that allows users to purchase, trade, or transfer virtual items, such as virtual currency, in a virtual gaming environment.

In some implementations, an additional functionality 121 may include a following functionality that allows user A and user B to follow each other into a game 122 or into a specific gaming environment of a game 122 hosted by the collaboration platform 120. For example, user A may be participating in a game 122A. The following functionality may allow user B to navigate to a profile page of the user A and select an option, "Join Game," on user A's profile page, which places user B in the game 122A (e.g., the specific gaming environment of game 122A where user A is participating). In implementations, the following functionality may also include a notification feature that for example, notifies user B of the game in which user A has moved or is currently participating.

In some implementations, an additional functionality 121 may include an invitation functionality that allows user A and user B to invite each other to a private game hosted by the collaboration platform 120. For example, user A may create a private game and the invitation functionality may allow user A to invite user B to participate in the private game.

In some implementations, an additional functionality 121 may include a group functionality that allows user A and user B to join a group hosted by the collaboration platform 120. For example, the additional functionality 121 may allow user A to invite user B to a group where user A is a group member or group creator. Members of a group may participate with each other to compete against a different group in a game 122, may participate with each other in building (e.g., environments, structures, etc.) within a game 122, may participate with each other to create a game 122 (e.g., via creator module 126), may engage in discussions with each other (e.g., via messaging module 128, a group discussion), etc.

In some implementations, an additional functionality 121 includes an interaction functionality that allows user A and user B to interact with each other via the collaboration platform 120. For example, the base functionality may allow a user to participate in single-player games (but not multi-player games) and the interaction functionality may allow the user to participate in multi-player games. In another example, the base functionality may allow user A to compete against other users in a game 122 and the interaction functionality may allow user A to work together with user B to compete against other users in a game 122.

The client devices 110A through 110B may each include computing devices such as personal computers (PCs), mobile devices (e.g., laptops, mobile phones, smart phones, tablet computers, or netbook computers), network-connected televisions, gaming consoles, etc. In some implementations, client devices 110A through 110B may also be referred to as "user devices." In implementations, one or more client devices 110 via collaboration application 114 may connect to collaboration platform 120 at any given moment.

In implementations, each client device 110 may include an instance of collaboration application 114. In one implementation, the collaboration application 114 may be an application that allows users to use and interact with collaboration platform 120, such as control a virtual character in a virtual game hosted by collaboration platform 120, or view or upload content, such as images, video items, web pages, documents, and so forth. In one example, the collaboration application 114 may be a web browser that can access, retrieve, present, and/or navigate content (e.g., virtual character in a virtual environment, etc.) served by a web server. The collaboration application 114 may render, display, and/or present the content (e.g., a web page, a media viewer) to a user. In an implementation, the collaboration application 114 may also include an embedded media player (e.g., a Flash® player) that is embedded in a web page. In another example, the collaboration application 114 may be a standalone application (e.g., a mobile application, app, or a gaming program) that allows users to interact with collaboration platform 120. According to aspects of the disclosure, the collaboration application 114 may be a collaboration platform application for users to create, edit, upload content to the collaboration platform 120 as well as interact with collaboration platform 120. As such, the collaboration applications 114 may be provided to the client devices 110A and 110B by the server 130 or collaboration platform 120. In another example, the collaboration applications 114 may be applications that are downloaded from the server 130.

In implementations, a user may login to collaboration platform 120 via collaboration application 114. The user may access a user account by providing user account information (e.g., user name and password) where the user account is associated with one or more characters available to participate in one or more games 122 of collaboration platform 120.

In general, functions described in one implementation as being performed by the collaboration platform 120 can also be performed on the client devices 110A through 110B, or sever 130, in other implementations if appropriate. In addition, the functionality attributed to a particular component can be performed by different or multiple components operating together. The collaboration platform 120 can also be accessed as a service provided to other systems or devices through appropriate application programming interfaces, and thus is not limited to use in websites.

In implementations, collaboration platform 120 may include messaging module 128. In implementations, messaging module 128 may be a system, application, or module that allows users to exchange electronic messages via a communication system, such as network 105. Messaging module 128 may be associated with collaboration application 114 (e.g., module of collaboration application 114 or be a separate application). In implementations, users may interface with messaging module 128 and exchange electronic messages among users of collaboration platform 120. Messaging module 128 may be, for example, an instant messaging application, a text messaging application, an email application, a voice messaging application, a video messaging application, or a combination of multiple applications, among others.

In implementations, messaging module 128 may facilitate the exchange of electronic messages between users. For example, a user may be logged into a messaging application on client device 110A, and another user may be logged into a messaging application on client device 110B. The two users may start a conversation, such as an instant messaging conversation. Messaging module 128 may help facilitate the messaging conversation by sending and receiving the electronic messages between the users of collaboration platform 120.

For the sake of illustration, proximity friending module 140 is implemented on server 130. In other implementations, proximity friending module 140 may in part or wholly be implemented on client device 110. In other implementations, proximity friending module 140 may in part or wholly be implemented on collaboration platform 120. In other implementations, proximity friending module 140 operating on one or more of client device 110, server 130, or collaboration platform 120 may work in conjunction to perform the operations described herein. In implementations, proximity friending module 140 of client devices 110 may be a separate application or part of collaboration application 114 (e.g., add-in).

Although implementations of the disclosure are discussed in terms of collaboration platforms, implementations may also be generally applied to any type of social network providing connections between users.

In situations in which the systems discussed here collect personal information about users, or may make use of personal information, the users may be provided with an opportunity to control whether the collaboration platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the collaboration platform 120.

Figure 2:
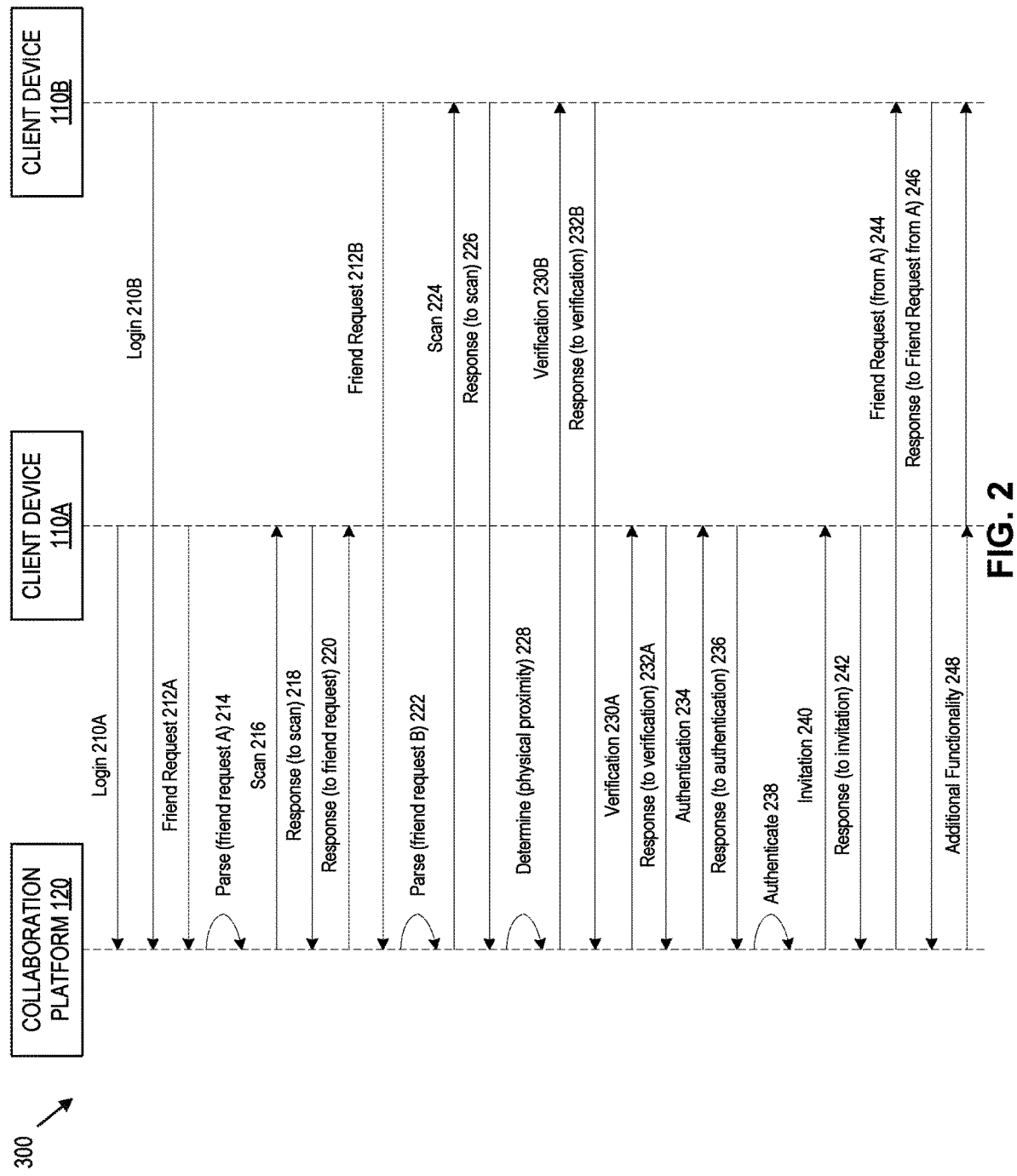
FIG. 2 is a diagram of operations of proximity friend finding, in accordance with implementations of the disclosure.

FIG. 2 is a diagram of operations for proximity friend finding, in accordance with implementations of the disclosure. System 200 may include similar components as system architecture 100 as described with respect to FIG. 1. It may be noted that components of FIG. 1 may be used herein to help describe FIG. 2. In implementations, collaboration platform 120 may implement the proximity friending module 140 to perform some or all the operations. In other implementations, collaboration platform 120 (using proximity friending module 140) may interact with client devices 110 (using respective proximity friending modules 140) to perform operations described with respect to FIG. 2. For purpose of illustration, rather than limitation, operations described as performed by collaboration platform 120 may be performed by any component of collaboration platform 120, unless otherwise described. For purposes of illustration, rather than limitation, operations performed by client device 110 may be performed by collaboration application 114 or proximity friending module 140. It may be noted that for the purposes of illustration, rather than limitation, "user A" is a user associated user account A (of the collaboration platform 120) and with client device 110A and "user B" is a user associated user account B and with client device 110B. The operations described with respect to FIG. 2 are shown to be performed serially for the sake of illustration, rather than limitations. It may be noted that in implementations the operations may be performed in any order, may be performed multiple times, or may include the same, fewer, or additional operations.

In implementations, proximity friending may include an attempt by user A to find friends that are nearby or in a physical proximity with user A. In implementations, physical proximity (also referred to as "proximity" herein) may refer to a physical closeness between two users or closeness of the client devices 110 of the users. In some implementations, physical proximity may be a range defined by the range of the network (e.g., Wi-Fi® network, WLAN) that the client devices 110 are accessing. In implementations, the physical proximity relative a user may be in a range that less than 1 mile (from the user), less than 1000 feet, or another range, if applicable.

In some implementations, an indication of physical proximity of two users may indicate the relative proximity between two users, where the relative proximity is determined without knowing the absolute location (e.g., longitude and latitude) of the two users. For example, system 200 may known or estimate that two users are proximate one another, but not know the absolute location of at least one of users. In other implementations, system 200 may know the location of the users and estimate the proximity of two or more users based on the known locations.

In implementations, proximity of two or more users may be implied from proximity indicators, such as network identifiers. For example, users that are identified as being on the same local areas network (LAN), such as a wireless LAN (WLAN) (e.g., Wi-Fi®), may be in physical proximity as implied by range constraints of WLAN systems, for example. In some implementations, the WLAN may operate in compliance with an 802.11 standard which describes a set of media access controls (MAC) and physical layer (PHY) specifications for implementing WLAN communications in one or more frequency bands.

Returning to FIG. 2, in implementations login operation 210A may be an operation where user A of client device 110A performs a login to collaboration platform 120. In one example, user A may supply login information, such as user account information (e.g., username and password) to collaboration platform 120 via collaboration application 114 or proximity friending module 140. In implementations, collaboration platform 120 may verify the login information and responsive to the verification, allow user A access to collaboration platform 120 and the user account content associated with user account A. In other implementations, user B of client device 110B may perform a similar login operation 210B as described above with respect to login operation 210A.

In implementations, user A may submit a friend request 212A (also referred to as a "proximity friend request" or "friend request operation" herein) to collaboration platform 120. In implementations, friend request 212A may be a request from client device 110A to establish a friendship (e.g., trusted friendship) with other users of collaboration platform 120 that are in physical proximity with user A. In some implementations, user A is logged in prior to submitting the friend request 212A. In an implementation, the friend request 212A includes user account information to help identify the user account associated with the user request, for example. In some implementations, friend request 212A may include an indicator of physical proximity (also referred to as "physical proximity indicator" or "proximity indicator" herein). In other implementations, friend request 212A may not include a physical proximity indicator. In implementations, a physical proximity indicator may be data that is used to determine the physical proximity of two or more users. For example, a physical proximity indicator may be a network identifier that identifies the WLAN being accessed by client device 110A. In implementations, the network identifier may be a service set identifier (SSID) or other network identifier.

In one example, user A of client device 110A may access a "friends" section of collaboration application 114 (or proximity friending module 140). User A may select a user input control, such as a "find nearby friends" button, which initiates collaboration application 114 (or proximity friending module 140) to send friend request 212A to collaboration platform 120. In implementations, if user A is not on A WLAN the friend request 212A may be denied by collaboration platform 120 and a notification may be sent to client device 110A indicating the denial.

In implementations, collaboration platform 120 may perform a parse operation 214 to parse friend request 212A. In implementations, collaboration platform 120 parses the friend request 212A to determine the type of request (e.g., a proximity friend request or other). In some implementations, parse operation 214 parses the friend request 212A to identify user account information or a physical proximity indicator.

In implementations, collaboration platform 120 may keep a record of the friend request 212A and the information associated with the friend request 212A. In implementations, collaboration platform 120 may record the friend request 212A by associating friend request 212A with the particular user account (e.g., user account of user A). In implementations, collaboration platform 120 may record a status identifier that indicates a state of a particular friend request 212A (e.g., pending, canceled, paused, etc.). The status identifier may be associated with the particular user account (e.g., user account A of user A). In an example, collaboration platform 120 responsive to receiving (or parsing) friend request 212A may update a status associated a particular user account A to indicate that friend request 212A is currently pending (e.g., pending status). In some implementations, the physical proximity indicator may be recorded and associated with appropriate user account.

In implementations, responsive to receiving friend request 211A, collaboration platform 120 may initiate a scan operation 216. In implementations, scan operation 216 may send one or more requests to client device 110A requesting a physical proximity indicator from client device 110. In some implementations, the scan operation 216 may send a request once, multiple times, periodically, or at intervals, for example.

In one example, collaboration platform 120 may (scan) send a request to proximity friending module 140 requesting a physical proximity indicator. In one embodiment, proximity friending module 140, responsive to the request from collaboration platform 120, queries client device 110 or an application of client device 110 for the physical proximity indicator, such as an identifier of the WLAN currently accessed by the client device 110. For example, responsive to the request from collaboration platform 120, proximity friending module 140 of client device 110 may send a system call to the operating system (OS) of the client device 110 to request the physical proximity indicator or send a function call to another application executing on client device 110. The physical proximity indicator may be sent to proximity friending module 140 responsive to the call and proximity friending module 140 may then send the physical proximity indicator to collaboration platform 120.

In implementations, in response to scan operation 216, client device 110A (e.g., proximity friending module 140) performs scan response operation 218 and sends a response to collaboration platform 120 that may include the physical proximity indicator. In implementations, the response may also include user account information.

In some implementations, collaboration platform 120 may continue to perform scan operation 216 regardless of whether or not a physical proximity indicator is received from client device 110A. For example, collaboration platform 120 may continue to perform scan operation 216 as part of an effort to determine whether user A is still accessing the same WLAN identified by an initial physical proximity indicator. In some implementations, if collaboration platform 120 (using multiple scan operations 216) determines client device 110A is no longer accessing the same WLAN, collaboration platform 120 may cancel friend request 212A (and update pending status of friend request 212A to canceled status, for example). In other implementations, if collaboration platform 120 (using multiple scan operations 216) identifies that client device 110A is no longer accessing the same WLAN but is accessing a different WLAN, collaboration platform 120 may continue to execute friend request 212A and update the physical proximity indicator associated with the new WLAN. In other implementations, collaboration platform 120 may cancel the friend request 212A responsive to receiving a threshold number (or threshold amount of time) of responses to scan operation 216 that do not include the same physical proximity indicator or do not include any physical proximity indicator.

In some implementations, collaboration platform 120 may perform a determination operation (not shown, but similar to determine operation 228), to determine if any friends have been located proximate user A. In the current example, no friends are yet determined to be proximate user A.

In implementations, collaboration platform 120 may send one or more friend request responses 220 to client device 110A to update user A (e.g., proximity friending module 140) on whether any proximate friends have been found responsive to friend request 212A. In the current example, collaboration platform 120 has not located any friends proximity to user A and the friend request response 220 may indicate that no proximate friends have currently been found. In one example, client device 110A may use the information included in friend request response 220 and show a map or other indicator showing that no friends have been located proximate user A. In the present example, it may be noted that although no users have been located proximate found to be proximate user A, friend request 212A may still be pending until canceled, in accordance with some implementations.

In some implementations, user B sends friend request 212B to collaboration platform 120. Friend request 212B may be similar to friend request 212A sent by client device 110A, as described above. In implementations, collaboration platform 120 may perform a parse operation 222 to parse friend request 212B. Parse operation 222 may be similar to parse operation 214, as described above. Collaboration platform 120 may perform a scan operation 224 to request a physical proximity indicator from client device 110B. Scan operation 224 may be similar to scan operation 216, as described above. Client device 110B may perform a scan response operation 226 and send a response to the scan operation 224 that includes a physical proximity indicator for client device 110B. Scan response operation 226 may be similar to response operation 218, as described above.

It may be noted that collaboration platform 120 may keep a record associated with the user account of user B in a similar manner that collaboration platform 120 keeps a record associated with the user account of user A with respect to friend request 212A. For example, the user account of user B may be associated with a pending status indicating that friend request 212B is pending and may also be associated with a physical proximity indicator received from client device 110B.

In implementations, collaboration platform 120 may perform a determine operation 228 to determine whether any users of the collaboration platform 120 are in the physical proximity of user A. For the sake of illustration, rather than limitation, the following operations are described as being performed responsive to friend request 212A from client device 110A of user A. It may be noted, that additional similar operations may be performed responsive to friend request 212B from client device 110B of user B.

In implementations, collaboration platform 120 may determine whether any users of collaboration platform 120 are in the physical proximity of user A by comparing the physical proximity indicator associated with user A to the physical proximity indicators associated with other users that are requesting proximity friendships. In implementations, if the physical proximity indicators are similar or match, collaboration platform 120 may determine the users are in physical proximity. For example, collaboration platform 120 may check the record to determine whether the physical proximity indicator associated with user account A of user A matches a physical proximity indicator associated with the user accounts of other users. If collaboration platform 120 determines a match between physical proximity indicators, collaboration platform 120 may determine that the user A is in physical proximity of another user associated with the same physical proximity indicator.

In some implementations, responsive to determining a match between physical proximity indicators, collaboration platform 120 may perform an invitation operation 240 where, for example, collaboration platform 120 sends an invitation to client device 110A that allows user A to send a friend request to another proximate user. Additional details of the invitation operation 240 may be described below. It may be noted that in some implementations an invitation operation 240 may be performed responsive to a combination of one or more factors in addition to or in lieu of matching physical proximity indicators associated with two different user accounts. For example, in some implementations invitation operation 240 may be performed responsive to determining that two users are logged in, in physical proximity, and have pending friend requests 212.

In some implementations, determining operation 228 may include collaboration platform 120 determining whether user A and any other users of collaboration platform 120 are currently requesting (e.g., have pending friend requests 212) a proximity friendship on collaboration platform 120 and whether any of the other users are in physical proximity to user A. For example, collaboration platform 120 may check the record to determine if another user account has a pending status (e.g., to a friend request 212) and compare the physical proximity indicator associated with user account A with the physical proximity indicator associated with the other user account. If the users have a pending friend request 212 and matching physical proximity indicators, collaboration platform 120 may perform an invitation operation 240.

In one implementation, collaboration platform 120 may perform verification operations 230A and 230B (also referred to as verification operations 230) to verify if users A and B are still or currently in physical proximity. In some implementations, collaboration platform 120 may perform verification operation 230 responsive to determining user A and user B are in physical proximity or determining user A and user B are currently requesting a proximity friendship or both. In some implementations, verification operations 230 may help confirm that users are still or currently in proximity with one another. For example, user A and user B may have submitted friend requests 212 and each user may have used the same WLAN at some point in time (as determined from matching physical proximity indicators). At a later time, user A or user B moved from the range of the common WLAN. The verification operations 230 help identify if user A and user B are currently in proximity of one another. In implementations, collaboration platform 120 may perform verification operation 230A by sending a query to client device 110A for a physical proximity indicator. Responsive to the query, client device 110A may send a response to the verification query (verification response operation 232A) than includes a physical proximity indicator. Similar operations, verification operation 230B and verification response operation 232B, may be performed by collaboration platform 120 and client device 110B, respectively.

In some implementations, verification operations 230 may be performed in a similar manner as scan operation 216 as described above. In performing verification operations 230, collaboration platform 120 may determine that client device 110A or 110B or both are no longer accessing the same WLAN and cancel or update the corresponding friend request 212 in a similar manner as described with respect to scan operation 216 above. It may be noted that verification operation 230 may be performed one or more times for a particular client device 110 in implementations.

In some implementations, responsive to verifying user A and user B are currently in physical proximity, collaboration platform 120 collaboration platform 120 may perform an invitation operation 240. In some implementations, responsive to verifying that user A and user B are not currently in physical proximity, collaboration platform 120 may refrain performing an invitation operation 240.

In some implementations, collaboration platform 120 may perform an authentication request operation 234 by sending an authentication request to client device 110A to authenticate user A. In implementations, the authentication request may request authentication information from user A to confirm that user A is in fact user A. Authentication information may include user password, user questions, or other information that user A knows, and others are not likely to know. In implementations, client device 110A performs an authentication response operation 236 where client device 110A sends a response to the authentication request that includes an indication of the authentication information. For example, collaboration platform 120 may request user A for password information. User A may enter the password, and client device 110A sends the password back to collaboration platform 120.

In implementations, collaboration platform 120 may perform authentication operation 238 by comparing the received authentication information to other authentication information associated with user A or user account A. If a match is determined, user A may be authenticated. If a match is not determined, authentication is denied and collaboration platform 120 may re-send one or more authentication requests or cancel friend request 212A (and change associated status information, and so forth).

In implementations, responsive to authenticating user A, collaboration platform 120 may perform an invitation operation 240 where an invitation to send a friend request to a (potential) proximate friend is sent to client device 110A. The invitation may identify the potential proximate friend and allow user A to send a friend request to the potential proximate friend. In some implementations, an invitation operation 240 may send invitation information such as the user account name of the potential proximate friend (e.g., other user determined to be proximate user A), an avatar or image associated with the potential proximate friend's account, information regarding a mutual friend(s) (e.g., account name of mutual friend(s), indicator that no mutual friends exist, etc.), user input control options (e.g., invite, cancel, ignore, etc.) to be presented with the invitation at the client device 110A. In an example, client device 110 may receive the invitation from collaboration platform 120. The invitation to send a friend request to a proximate friend may be displayed on client device 110A with some or all the invitation information. In one example, the image of the proximate friend and account name of the proximate friend may be displayed to the user as well as a user input control that enables the user to send the friend request to the other user.

In implementations, client device 110A may perform an invitation response operation 242 that sends a response to invitation 240 than includes the user selection to the invitation (e.g., user selects send friend request to the other user). In some implementations, the invitation to user A may be valid until collaboration platform 120 determines the physical proximity indicator associated with user A has changed (responsive to which collaboration platform 120 may cancel the invitation). In some examples, collaboration platform 120 may continue to perform scan operations, such as scan operation 216, to determine if the physical proximity indicator associated with client device 110A has changed. In some implementations, collaboration platform 120 may maintain the invitation for a threshold amount of time before canceling the invitation or maintain the invitation irrespective of whether or not the physical proximity indicator associated with client device 110A changes.

In implementations, responsive to receiving an invitation response that indicates user A would like to send a friend request to the proximate friend, collaboration platform 120 performs a friend request operation 244 that sends a friend request on behalf of user A to user B. In some implementations, the request may include user input controls that allow user B to select one or more of accepting the friend request, denying the friend request, or blocking the sending user from future friend requests. In implementations, client device 110B may perform a friend request response operation 246 that sends user B's response to the friend request from user A. If user B accepts the friend request, the users A and B are established as proximate friends. In some implementations, if user B blocks user A, user A is blocked from sending future friend requests to user B. In some implementations, the friend request from user A may be valid until collaboration platform 120 determines the physical proximity indicator associated with user B or user A has changed. In some implementations, collaboration platform 120 may maintain the invitation for a threshold amount of time (before canceling the invitation) or maintain the invitation irrespective of whether or not the physical proximity indicator associated with client device 110A or 110B changes.

In some implementations, responsive to user A and user be becoming proximate friends, a trusted relationship is established between user A and user B. In implementation, users of a trusted relationship may have additional privileges or additional functionality 248 as described above with respect to FIG. 1. For example, collaboration platform 120 may enable one or more additional functionalities 248 for user A and user B.

Figure 3:
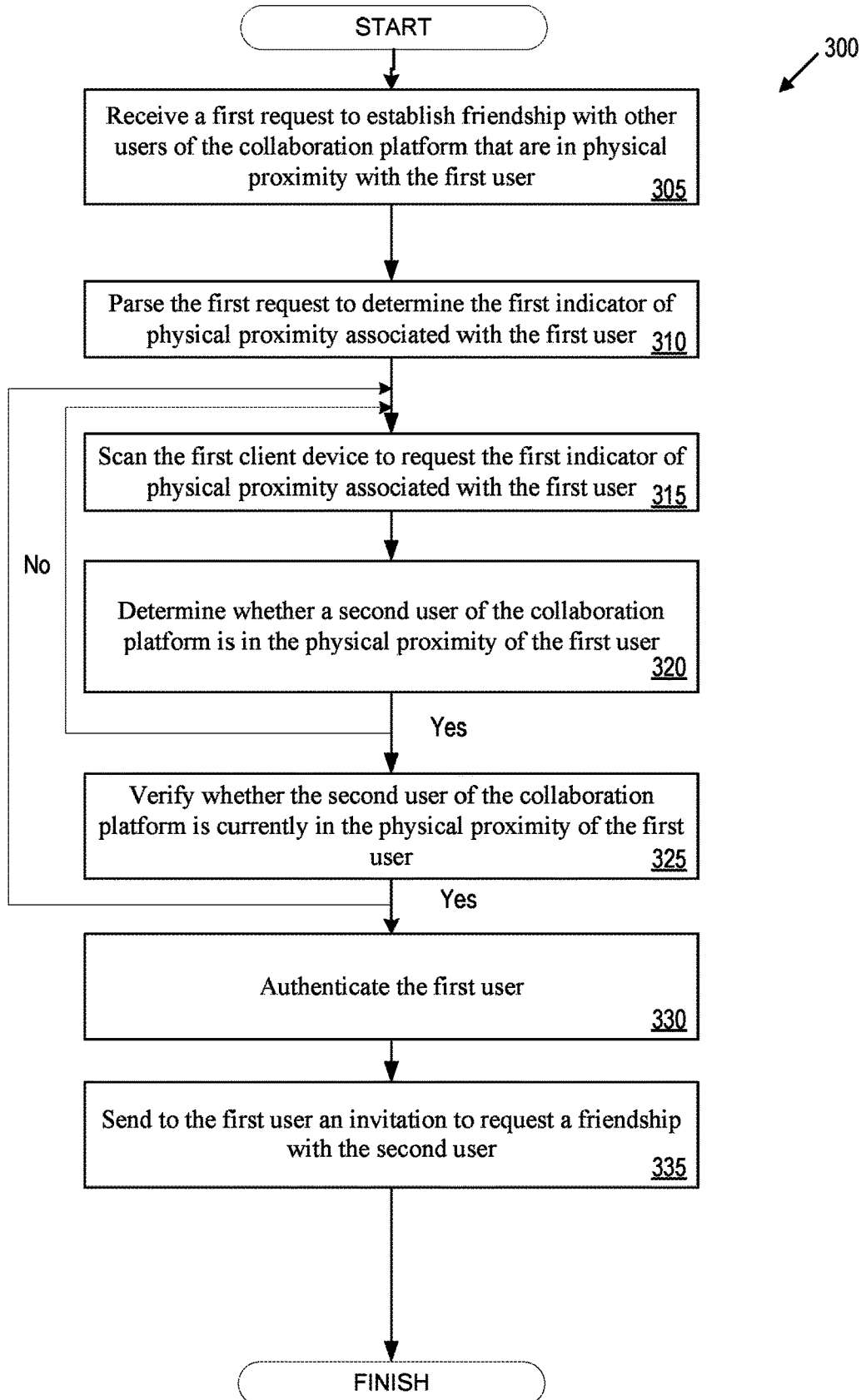
FIG. 3 is a flow diagram illustrating method for establishing a proximity friendship, in accordance with some implementations.

FIG. 3 is a flow diagram illustrating method 300 for establishing a proximity friendship, in accordance with some implementations. Method 300 may be performed by processing logic that includes hardware (e.g., circuitry, dedicated logic, programmable logic, microcode), software (e.g., instructions run on a processing device to perform hardware simulation), or a combination thereof. In some implementations, proximity friending module 140 executing at collaboration platform 120, client device 110A, client device 110B or combination thereof may perform some or all the operations. Components of FIG. 1 and FIG. 2 may be used to help illustrated method 300.

Method 300 begins at block 305 where processing logic receives, from client device 110A associated with user A of a collaboration platform 120, a first request to establish friendship with other users of the collaboration platform 120 that are in physical proximity with the user A. At block 310, processing logic parses the first request to determine the first indicator of physical proximity associated with the user A. At block 315, processing logic responsive to receiving the first request to establish friendship with the other users, scans the client device 110A to request the first indicator of physical proximity. At block 320, processing logic determines whether another user(s) of the collaboration platform 120 is in the physical proximity of the user A by comparing a first indicator of physical proximity associated with the user A (e.g., user account) with a second indicator of physical proximity associated with other users. If processing logic determines that another user is not in the physical proximity of user A, processing logic may return to block 315. If processing logic determines that another user is in the physical proximity of user A, processing logic may proceed to block 325.

At block 325, processing logic verifies whether the other user of the collaboration platform 120 is currently in the physical proximity of the user A by querying the client device 110A for the first indicator of physical proximity and another client device 110B (of the other client) for the second indicator of physical proximity. If processing logic does not verify the other user is currently in the physical proximity of user A, processing logic may return to block 315. If processing logic does verify the other user is currently in the physical proximity of user A, processing logic may proceed to block 330.

At block 330, processing logic authenticates user A based on a response to a authentication request. At block 335, processing logic sends user A an invitation to request a friendship with the other user.

Figure 4:
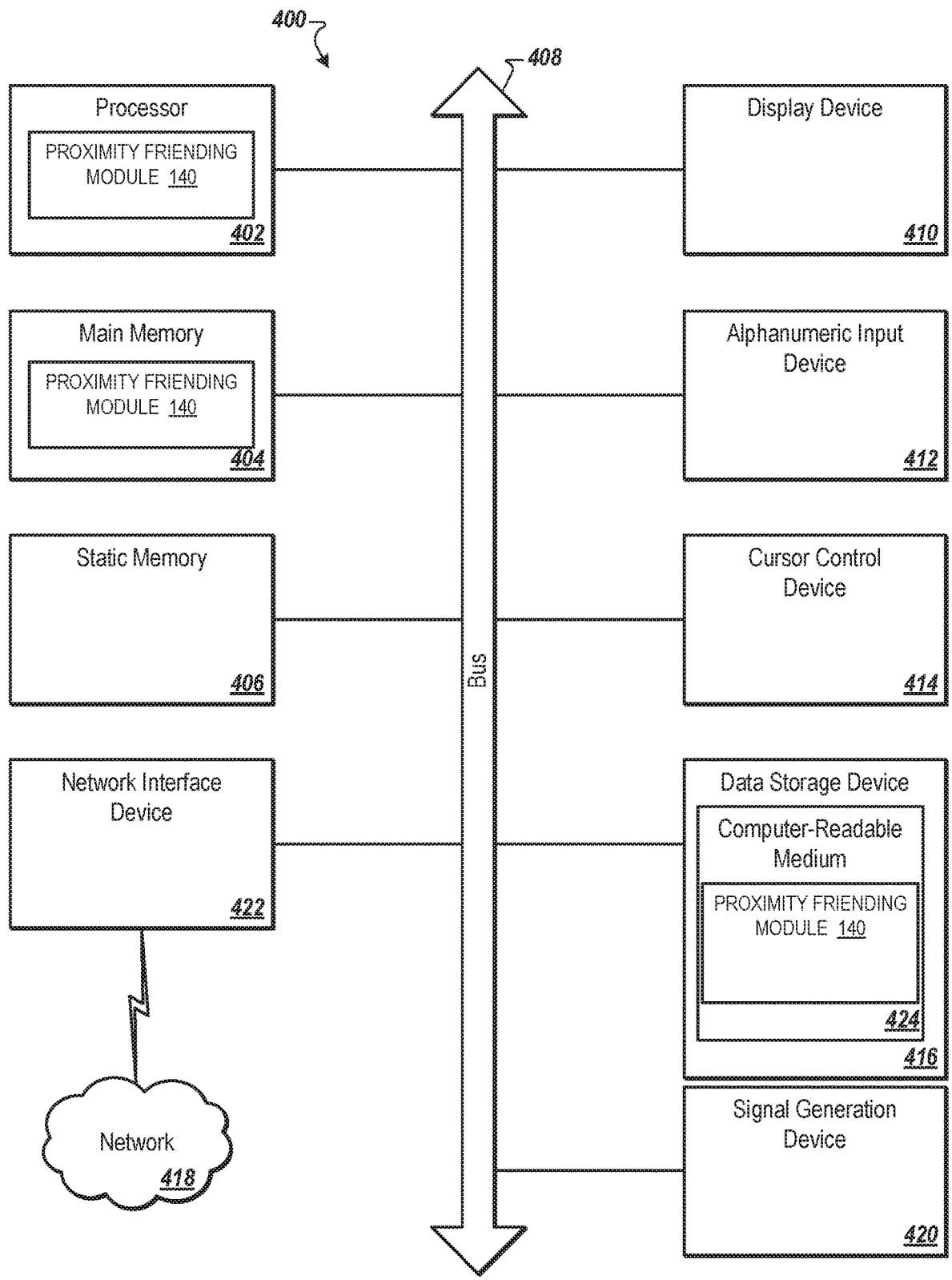
FIG. 4 is a block diagram illustrating an exemplary computer system, in accordance with implementations.

FIG. 4 is a block diagram illustrating an exemplary computer system 400, in accordance with implementations. The computer system 400 executes one or more sets of instructions that cause the machine to perform any one or more of the methodologies discussed herein. Set of instructions, instructions, and the like may refer to instructions that, when executed computer system 400, cause computer system 400 to perform one or more operations of proximity friending module 140. The machine may operate in the capacity of a server or a client device in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 416, which communicate with each other via a bus 408.

The processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 402 may also be one or more special-purpose processing devices such as an application specific integrated circuit (ASIC), a field programmable gate array (FPGA), a digital signal processor (DSP), network processor, or the like. The processing device 402 is configured to execute instructions of the system architecture 100 and the proximity friending module 140 for performing the operations discussed herein.

The computer system 400 may further include a network interface device 422 that provides communication with other machines over a network 418, such as a local area network (LAN), an intranet, an extranet, or the Internet. The computer system 400 also may include a display device 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a non-transitory computer-readable storage medium 424 on which is stored the sets of instructions of the system architecture 100 and proximity friending module 140 embodying any one or more of the methodologies or functions described herein. The sets of instructions of the system architecture 100 and proximity friending module 140 may also reside, completely or at least partially, within the main memory 404 and/or within the processing device 402 during execution thereof by the computer system 400, the main memory 404 and the processing device 402 also constituting computer-readable storage media. The sets of instructions may further be transmitted or received over the network 418 via the network interface device 422.

While the example of the computer-readable storage medium 424 is shown as a single medium, the term "computer-readable storage medium" can include a single medium or multiple media (e.g., a centralized or distributed database, and/or associated caches and servers) that store the sets of instructions. The term "computer-readable storage medium" can include any medium that is capable of storing, encoding or carrying a set of instructions for execution by the machine and that cause the machine to perform any one or more of the methodologies of the present disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "receiving," "authenticating," "determining," "parsing," "sending," "scanning," "verifying," "identifying," or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Other implementations will be apparent to those of skill in the art upon reading and understanding the above description. The scope of the disclosure may, therefore, be determined with reference to the appended claims, along with the full scope of equivalents to which such claims are entitled.

What is claimed is:

1. A method comprising:

authorizing, by a server, a first user account associated with a first user to access a online gaming platform based on a first user account identifier received from a first client device via a first network;

subsequent to authorizing the first user account associated with the first user to access the online gaming platform, receiving, from the first client device associated with the first user, a first request to establish friendships via the online gaming platform with other user accounts associated with other users that are estimated to be in physical proximity with the first user;

authorizing, by the server, a second user account associated with a second user to access the online gaming platform based on a second user account identifier received from a second client device via a second network;

comparing, by the server, a first network identifier indicative of a network accessed by the first client device to a second network identifier indicative of a network accessed by the second client device, wherein the first network identifier comprises a service set identifier of a local area network being accessed by the first client device;

estimating, by the server, whether the first client device associated with the first user is in physical proximity to the second client device associated with the second user by comparing the first network identifier and the second network identifier;

determining whether the first user account and the second user account each satisfy an age threshold; and responsive to estimating that the first client device and the second client device are in the physical proximity based on the comparison and determining that the first user account and the second user account each satisfy the age threshold, sending, by the server to the first client device, an invitation to establish a friendship with the second user account, and providing functionality that enables the first user account and the second user account to interact via the online gaming platform based on the established friendship between the first user account and the second user account.

2. The method of claim 1, further comprising:
parsing the first request to determine the first network identifier associated with the first client device, wherein the first request comprises the first network identifier.

3. The method of claim 1, further comprising:
responsive to receiving the first request to establish friendships via the online gaming platform with the other user accounts associated with the other users, scanning the first client device for the first network identifier; and
receiving the first network identifier responsive to scanning the first client device for the first network identifier.

4. The method of claim 1, further comprising:
receiving, from the second client device associated with the second user of the online gaming platform, a second request to establish the friendships via the online gaming platform with the other user accounts associated with the other users that are estimated to be in physical proximity with the second user; and
determining whether the first user account and the second user account are concurrently requesting to establish the friendships via the online gaming platform with the other user accounts associated with the other users of the online gaming platform,
wherein sending the invitation to establish the friendship with the second user account to the first client device associated with the first user is further responsive to determining that the first user account and the second user account are concurrently requesting to establish the friendships via the online gaming platform.

5. The method of claim 1, further comprising:
querying the first client device for a third network identifier and the second client device for a fourth network identifier to verify whether the estimate that the first client device and the second client device are in the physical proximity is currently a valid estimate; and
responsive to verifying the estimate that the first client device and the second client device are in the physical proximity is currently not the valid estimate, canceling the invitation to establish the friendship with the second user account sent to the first client device.

6. The method of claim 1, further comprising:
sending an authentication request to the first client device to authenticate the first user; and
authenticating the first user based on a response to the authentication request, wherein the invitation to establish the friendship with the second user account is sent to the first client device further responsive to authenticating the first user.

7. The method of claim 1, wherein estimating whether the first client device associated with the first user is in physical proximity to the second client device associated with the second user by comparing the first network identifier and the second network identifier comprises:
determining that the first network identifier matches the second network identifier based on the comparing, wherein the first client device is estimated to be in the physical proximity to the second client device responsive to determining that the first network identifier matches the second network identifier.

8. The method of claim 1, wherein the first network identifier comprises an identifier of a wireless local area network accessed by the first client device associated with the first user.

9. The method of claim 1, further comprising:
establishing the friendship between the first user account and the second user account of the online gaming platform in view of the invitation to establish the friendship with the second user account; and
wherein providing the functionality that enables the first user account and the second user account to interact via the online gaming platform based on the established friendship comprises enabling a messaging functionality of the online gaming platform that permits sharing of types of information between the first user account and the second user account, wherein the sharing the types of information between the first user account and the second user account is restricted prior to establishing the friendship.

10. A system comprising:
a memory; and
a processing device, coupled to the memory, the processing device to:
authorize a first user account associated with a first user to access a online gaming platform based on a first user account identifier received from a first client device via a first network;
subsequent to authorizing the first user account associated with the first user to access the online gaming platform, receive, from the first client device associated with the first user, a first request to establish friendships via the online gaming platform with other user accounts associated with other users that are estimated to be in physical proximity with the first user;
authorize a second user account associated with a second user to access the online gaming platform based on a second user account identifier received from a second client device via a second network;
compare a first network identifier indicative of a network accessed by the first client device to a second network identifier indicative of a network accessed by the second client device, wherein the first network identifier comprises a service set identifier that identifies a local area network being accessed by the first client device;
estimate whether the first client device associated with the first user is in physical proximity to the second client device associated with the second user by comparing the first network identifier and the second network identifier;
determine whether the first user account and the second user account each satisfy an age threshold; and
responsive to estimating that the first client device and the second client device are in the physical proximity based on the comparison and determining that the first user account and the second user account each satisfy the age threshold,
send, to the first client device, an invitation to establish a friendship with the second user account, and
provide functionality that enables the first user account and the second user account to interact via the online gaming platform based on the established friendship between the first user account and the second user account.

11. The system of claim 10, the processing device further to:
parse the first request to determine the first network identifier associated with the first client device, wherein the first request comprises the first network identifier.

12. The system of claim 10, the processing device further to:
  responsive to receiving the first request to establish friendships via the online gaming platform with the other user accounts associated with the other users, scan the first client device for the first network identifier; and
  receive the first network identifier responsive to scanning the first client device for the first network identifier.

13. The system of claim 10, the processing device further to:
  receive, from the second client device associated with the second user of the online gaming platform, a second request to establish the friendships via the online gaming platform with other user accounts associated with the other users that are estimated to be in physical proximity with the second user; and
  determine whether the first user account and the second user account are concurrently requesting to establish the friendships via the online gaming platform with the other user account associated with the other users of the online gaming platform,
  wherein the processing device is to send the invitation to establish the friendship with the second user account to the first client device associated with the first user further responsive to determining that the first user account and the second user account are concurrently requesting to establish the friendships via the online gaming platform.

14. The system of claim 10, the processing device further to:
  query the first client device for a third network identifier and the second client device for a fourth network identifier to verify whether the estimate that the first client device and the second client device are in the physical proximity is currently a valid estimate; and
  responsive to verifying the estimate that the first client device and the second client device are in the physical proximity is currently not the valid estimate, cancel the invitation to establish the friendship with the second user account sent to the first client device.

15. The system of claim 10, the processing device further to:
  send an authentication request to the first client device to authenticate the first user; and
  authenticate the first user based on a response to the authentication request, wherein the invitation to establish the friendship with the second user account is sent to the first client device further responsive to authenticating the first user.

16. A non-transitory computer-readable medium with instructions stored thereon that, when executed by a processing device, cause the processing device to perform operations comprising:
  authorizing, by the processing device, a first user account associated with a first user to access a online gaming platform based on a first user account identifier received from a first client device via a first network;
  subsequent to authorizing the first user account associated with the first user to access the online gaming platform, receiving, from the first client device associated with the first user, a first request to establish friendships via the online gaming platform with other user accounts associated with other users that are estimated to be in physical proximity with the first user;
  authorizing, by the processing device, a second user account associated with a second user to access the online gaming platform based on a second user account identifier received from a second client device via a second network;
  comparing, by the processing device, a first network identifier indicative of a network accessed by the first client device to a second network identifier indicative of a network accessed by the second client device, wherein the first network identifier comprises a service set identifier that identifies a local area network being accessed by the first client device;
  estimating, by the processing device, whether the first client device associated with the first user is in physical proximity to the second client device associated with the second user by comparing the first network identifier and the second network identifier;
  determining whether the first user account and the second user account each satisfy an age threshold; and
  responsive to estimating that the first client device and the second client device are in the physical proximity based on the comparison and determining that the first user account and the second user account each satisfy the age threshold,
    sending, to the first client device, an invitation to establish a friendship with the second user account, and
    providing functionality that enables the first user account and the second user account to interact via the online gaming platform based on the established friendship between the first user account and the second user account.

17. The non-transitory computer-readable medium of claim 16, the operations further comprising:
  parsing the first request to determine the first network identifier associated with the first client device, wherein the first request comprises the first network identifier.

18. The non-transitory computer-readable medium of claim 16, the operations further comprising:
  responsive to receiving the first request to establish friendships via the online gaming platform with the other user accounts associated with the other users, scanning the first client device for the first network identifier; and
  receiving network identifier responsive to scanning the first client device for the first network identifier.

19. The non-transitory computer-readable medium of claim 16, the operations further comprising:
  querying the first client device for a third network identifier and the second client device for the second network identifier to verify whether the estimate that the first client device and the second client device are in the physical proximity is currently a valid estimate; and
  responsive to verifying the estimate that the first client device and the second client device are in the physical proximity is currently not the valid estimate, cancel the invitation to establish the friendship with the second user account sent to the first client device.

20. The non-transitory computer-readable medium of claim 16, the operations further comprising:
  sending an authentication request to the first client device to authenticate the first user; and
  authenticating the first user based on a response to the authentication request, wherein the invitation to establish the friendship with the second user account is sent to the first client device further responsive to authenticating the first user.

* * * * *